United States Patent
Sakurada et al.

(10) Patent No.: US 12,090,953 B2
(45) Date of Patent: Sep. 17, 2024

(54) VEHICLE CONTROL DEVICE, VEHICLE CONTROL SYSTEM, AND COMPUTER READABLE RECORDING MEDIUM

(71) Applicants: TOYOTA JIDOSHA KABUSHIKI KAISHA, Toyota (JP); CMC CORPORATION, Nagoya (JP)

(72) Inventors: Shin Sakurada, Toyota (JP); Yasuhisa Ohta, Toyota (JP); Naoyuki Takada, Toyota (JP); Yuki Tatsumoto, Nagoya (JP); Satoru Sakuma, Nagakute (JP); Tetsu Yajima, Nagoya (JP)

(73) Assignees: TOYOTA JIDOSHA KABUSHIKI KAISHA, Toyota (JP); CMC CORPORATION, Nagoya (JP)

( * ) Notice: Subject to any disclaimer, the term of this patent is extended or adjusted under 35 U.S.C. 154(b) by 868 days.

(21) Appl. No.: 17/150,386

(22) Filed: Jan. 15, 2021

(65) Prior Publication Data

US 2021/0237682 A1    Aug. 5, 2021

(30) Foreign Application Priority Data

Feb. 4, 2020   (JP) ................. 2020-017103

(51) Int. Cl.
*H04W 24/08* (2009.01)
*B60R 25/00* (2013.01)
*G08C 17/02* (2006.01)
*B60R 25/20* (2013.01)

(52) U.S. Cl.
CPC ............ *B60R 25/002* (2013.01); *G08C 17/02* (2013.01); *H04W 24/08* (2013.01); *B60R 25/2036* (2013.01); *B60R 2325/10* (2013.01); *G08C 2201/93* (2013.01)

(58) Field of Classification Search
CPC ............. B60R 25/002; B60R 25/2036; B60R 2325/10; B60R 25/24; B60R 25/40; B60R 25/2072; G08C 17/02; G08C 2201/93; H04W 24/08
See application file for complete search history.

(56) References Cited

U.S. PATENT DOCUMENTS

| 11,441,528 B2 * | 9/2022 | Ando | F02N 11/0866 |
| 2015/0266451 A1 * | 9/2015 | Oohara | B60R 25/24 701/2 |
| 2018/0338329 A1 * | 11/2018 | Sergakis | H04W 48/20 |

FOREIGN PATENT DOCUMENTS

| JP | 2008-127887 A | 6/2008 |
| JP | 2011-074721 A | 4/2011 |
| JP | 2016-037795 A | 3/2016 |
| JP | 2016047983 A * | 4/2016 |
| JP | 6148095 B2 * | 6/2017 |
| WO | 2019/044662 A1 | 3/2019 |

* cited by examiner

*Primary Examiner* — Peter D Nolan
*Assistant Examiner* — Demetra R Smith-Stewart
(74) *Attorney, Agent, or Firm* — Sughrue Mion, PLLC

(57) ABSTRACT

A vehicle control device includes a processor including hardware, the processor being configured to: stop a smart key function of a vehicle when a first state in which an intensity of a radio wave received from a predetermined wireless communication device is a threshold or more has continued for a predetermined time.

17 Claims, 3 Drawing Sheets

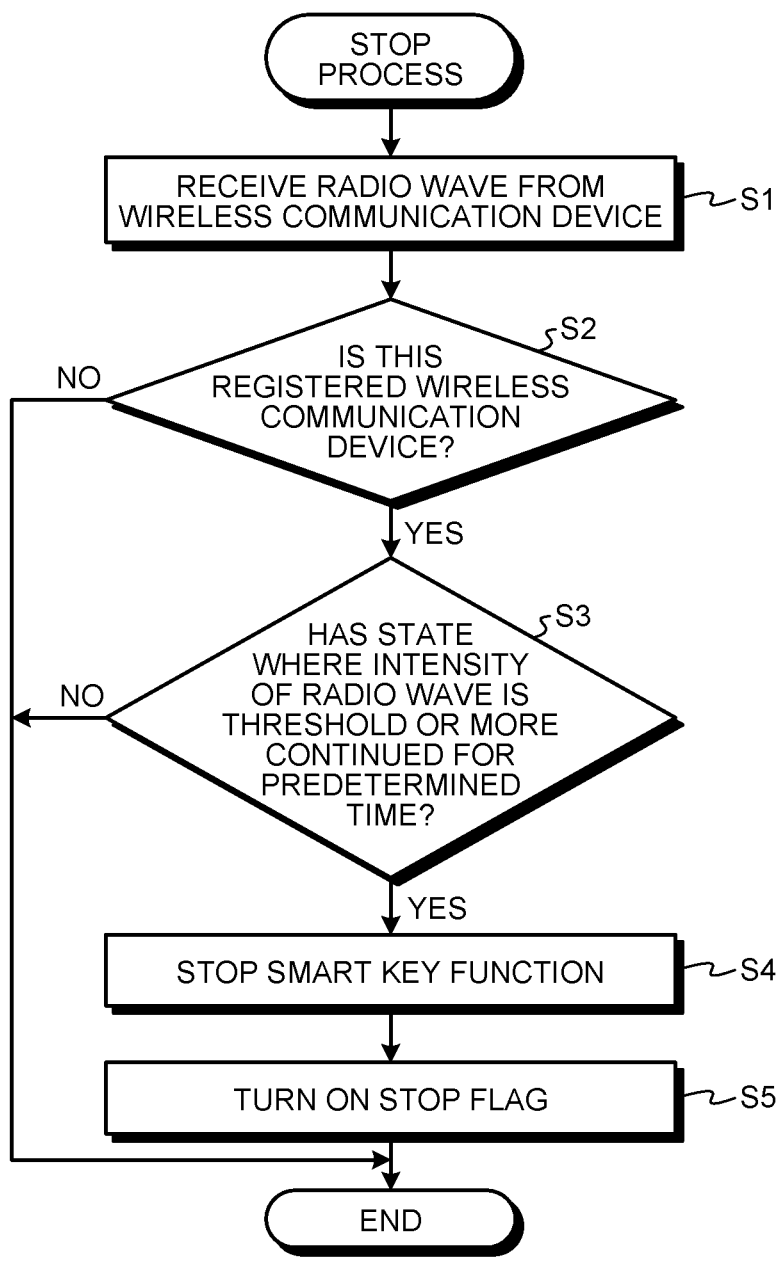

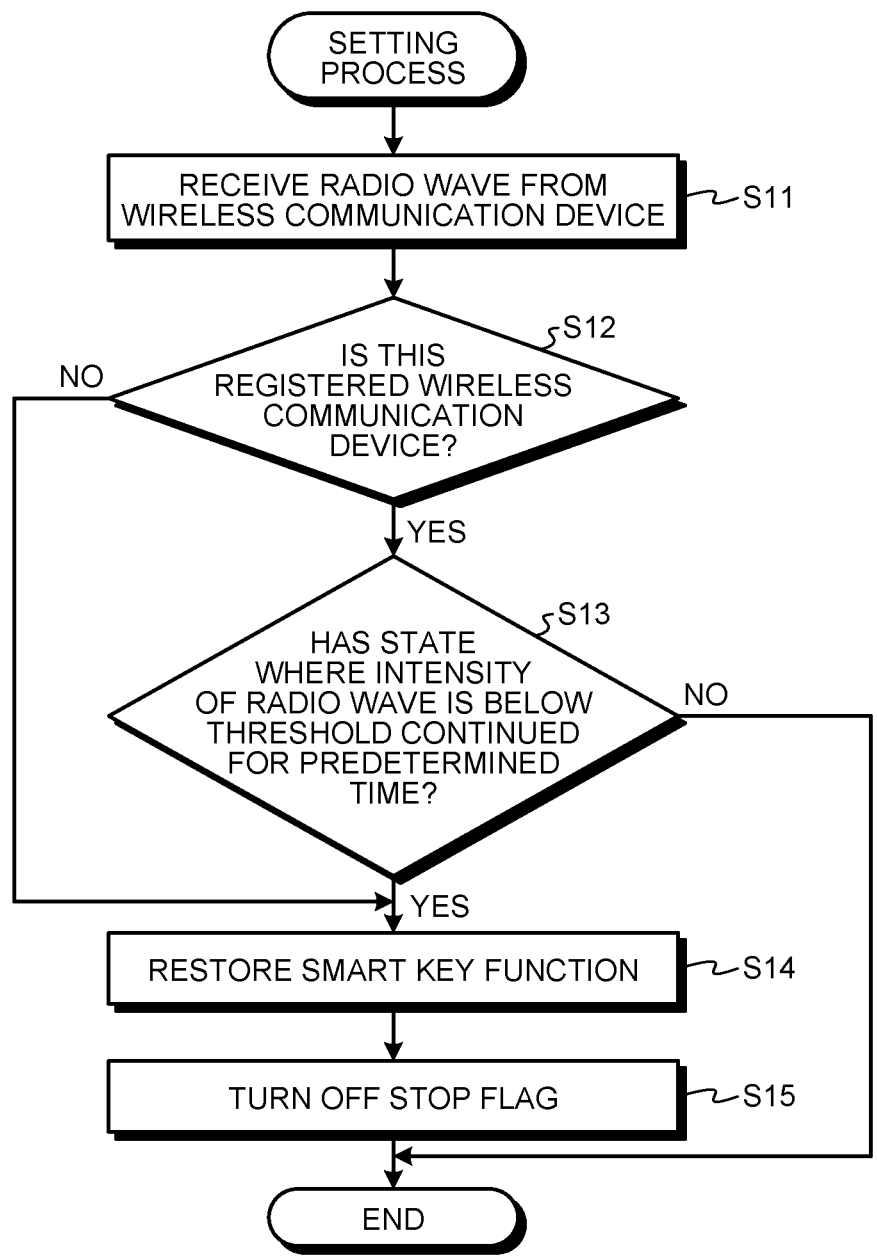

VEHICLE CONTROL DEVICE, VEHICLE CONTROL SYSTEM, AND COMPUTER READABLE RECORDING MEDIUM

The present application claims priority to and incorporates by reference the entire contents of Japanese Patent Application No. 2020-017103 filed in Japan on Feb. 4, 2020.

BACKGROUND

The present disclosure relates to a vehicle control device, a vehicle control system, and a computer readable recording medium.

JP 2011-74721 A discloses a smart entry system in which an electronic key includes a magnetic sensor that detects magnetism in at least three axis directions and which is configured to suppress execution of wireless communication with an in-vehicle device when it is determined that the electronic key is in a stationary state based on a detection result of the magnetic sensor.

SUMMARY

There is a need for a vehicle control device, a vehicle control system, and a computer readable recording medium capable of improving the convenience of a smart key function.

According to one aspect of the present disclosure, there is provided a vehicle control device including a processor including hardware, the processor being configured to: stop a smart key function of a vehicle when a first state in which an intensity of a radio wave received from a predetermined wireless communication device is a threshold or more has continued for a predetermined time.

BRIEF DESCRIPTION OF THE DRAWINGS

FIG. 2 is a flowchart illustrating a flow of a stop process according to the embodiment; and FIG. 3 is a flowchart illustrating a flow of a setting process according to the embodiment.

DETAILED DESCRIPTION

Figure 1:
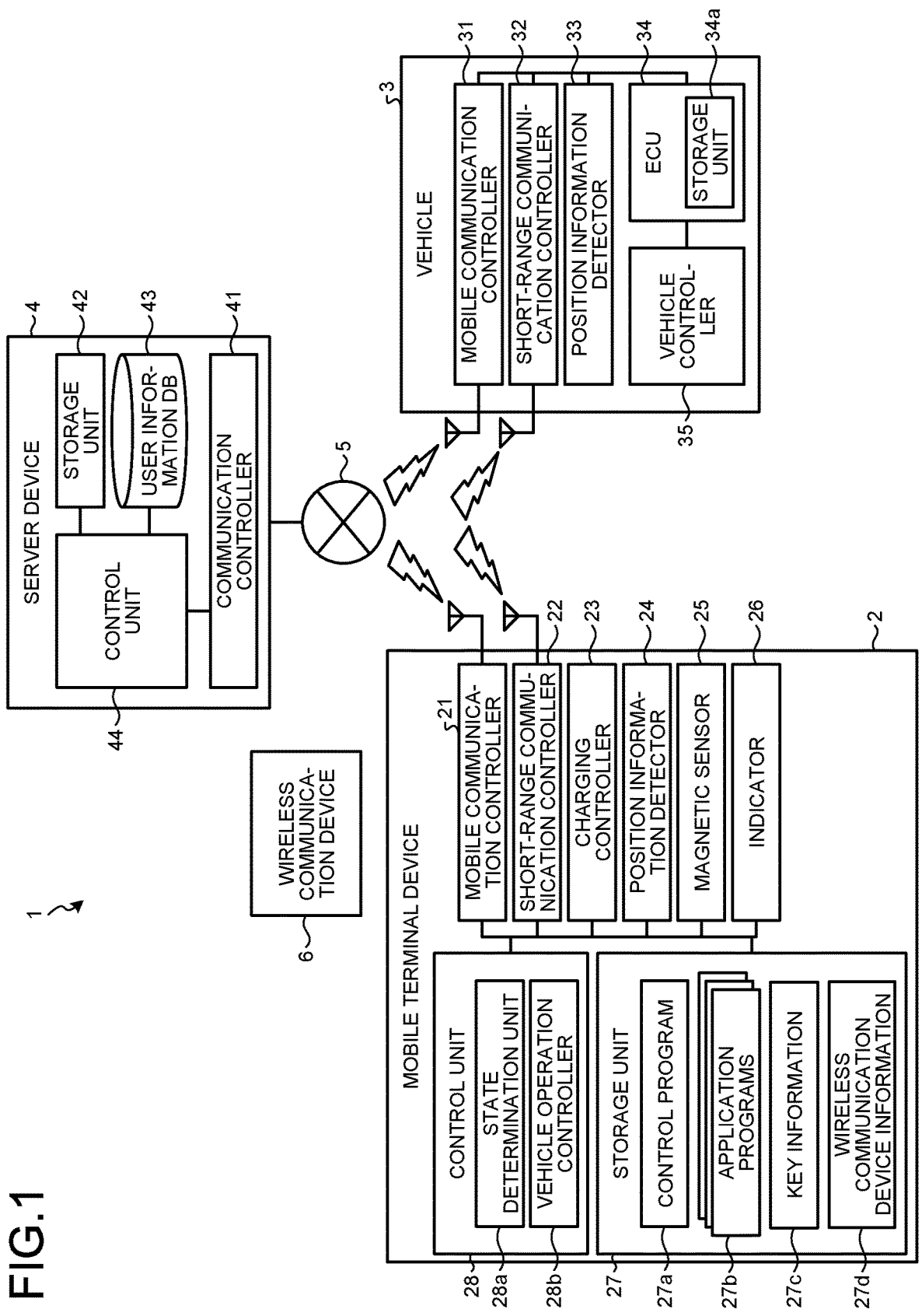
FIG. 1 is a block diagram illustrating a configuration of a vehicle control system according to an embodiment.

Hereinafter, a vehicle control system according to an embodiment will be described in detail with reference to the drawings.

First, a configuration of a vehicle control system according to the embodiment will be described with reference to FIG. 1.

The vehicle control system is provided for controlling a smart key function and a remote immobilizer function installed on a vehicle.

Here, the "smart key function" represents a function of unlocking and locking the door of a vehicle via short-range wireless communication between the key device carried by the user and the vehicle. The smart key function includes: a smart entry function in which, when a user who carries a key device approaches the vehicle, the vehicle side authenticates the key device through short-range wireless communication, and unlocks the door key in response to the user's touch on the door knob, etc. of the vehicle; and a remote keyless function in which the unlocking or the like of the door is performed by user's operation on a switch provided in the key device. In the present embodiment, turning on the smart key function to permit unlocking of the vehicle door by the short-range wireless communication is expressed as "setting (restoring) the smart key function", while turning off the smart key function to prohibit unlocking of the vehicle door by the short-range wireless communication is described as "stopping (cancelling) the smart key function".

Furthermore, the "remote immobilizer function" represents a function of prohibiting the startup of an engine of the vehicle by a remote operation from a server device. In the embodiment, turning on the remote immobilizer function to prohibit startup of the vehicle engine is expressed as "setting the remote immobilizer function", while turning off the remote immobilizer function to permit startup of the vehicle engine is expressed as "stopping (cancelling) the remote immobilizer function".

FIG. 1 is a block diagram illustrating the configuration of the vehicle control system. As illustrated in FIG. 1, a vehicle control system 1 includes a mobile terminal device 2, a vehicle 3, and a server device 4. The mobile terminal device 2, the vehicle 3, and the server device 4 are configured to be able to perform information communication with each other via a telecommunication line 5 such as an Internet network or a mobile phone network.

The mobile terminal device 2 functions as a key device. The mobile terminal device 2 is a device such as a smartphone or a smart key that may perform information communication with the vehicle 3 and the server device 4, and is carried by a user who owns the vehicle 3. In the present embodiment, the mobile terminal device 2 includes a mobile communication controller 21, a short-range communication controller 22, a charging controller 23, a position information detector 24, a magnetic sensor 25, an indicator 26, a storage unit 27, and a control unit 28.

The mobile communication controller 21 is a communication circuit for information communication via the telecommunication line 5, and controls information communication with the vehicle 3 and the server device 4 via the telecommunication line 5. Specifically, the mobile communication controller 21 modulates a transmission target signal into the frequency band of the telecommunication line 5 and transmits the modulated signal, while demodulating the received signal in the frequency band of the telecommunication line 5.

The short-range communication controller 22 includes an electronic circuit having an information communication function compliant with standards such as Near Field radio Communication (NFC), Bluetooth (registered trademark) Low Energy (BLE), Infrared Data Association (IrDA), and controls short-range wireless communication with the vehicle 3 and a wireless communication device 6. Specifically, the short-range communication controller 22 modulates the transmission target signal and transmits the modulated signal to the vehicle 3, while demodulating the signal received from the vehicle 3.

The charging controller 23 is a device that controls charging operation of a secondary battery such as a battery included in the mobile terminal device 2 by an external power source.

The position information detector 24 includes a device that receives a radio wave from a Global Positioning System (GPS) satellite and thereby detects position information of the mobile terminal device 2, and outputs an electric signal indicating the detected position information of the mobile terminal device 2 to the control unit 28.

The magnetic sensor 25 includes a magnetic sensor capable of detecting the direction of geomagnetism in three axial directions, for example, and outputs an electric signal indicating the detected direction of geomagnetism to the control unit 28. Using the magnetic sensor 25, it is possible to determine whether the mobile terminal device 2 is in a stationary state, for example.

The indicator 26 is lit or blinks in accordance with a control signal from the control unit 28 to present the user with operation states of the smart key function or the remote immobilizer function. This enables the user to constantly confirm the operation states of the smart key function and the remote immobilizer function.

The storage unit 27 includes a recording medium such as Erasable Programmable Read Only Memory (EPROM), a hard disk drive (HDD), and a removable medium. Examples of the removable medium include a Universal Serial Bus (USB) flash drive, or a disc recording medium such as a Compact Disc (CD), a Digital Versatile Disc (DVD), and a Blu-ray (registered trademark) Disc (BD). The storage unit 27 stores various computer programs and various types of control data necessary for the operation of the mobile terminal device 2. In the present embodiment, the storage unit 27 stores a control program 27a and various application programs 27b, which are computer programs, key information 27c used for the smart key function, and wireless communication device information 27d indicating information regarding the wireless communication device 6 (for example, an access point installed in a user's home and/or a company with which the user works) that performs short-range wireless communication with the mobile terminal device 2. The wireless communication device information 27d is registered in advance by the user's operation on the mobile terminal device 2.

The control unit 28 includes a processor such as a Central Processing Unit (CPU), a Digital Signal Processor (DSP), and a Field-Programmable Gate Array (FPGA), and a main storage unit including Random Access Memory (RAM), ROM, or the like. The control unit 28 loads the computer program stored in the storage unit 27 into the work area of the main storage unit and executes the computer program to control individual components of the mobile terminal device 2. In the present embodiment, the control unit 28 loads the control program 27a stored in the storage unit 27 into the work area of the main storage unit and executes the control program 27a, thereby functioning as a state determination unit 28a and a vehicle operation controller 28b. The functions of the state determination unit 28a and the vehicle operation controller 28b will be described below.

Examples of the vehicle 3 include a known vehicle such as an Electric Vehicle (EV), a Hybrid Vehicle (HV), and a Fuel Cell Electric Vehicle (FCEV). The vehicle 3 includes a mobile communication controller 31, a short-range communication controller 32, a position information detector 33, an Electric Control Unit (ECU) 34, and a vehicle controller 35.

The mobile communication controller 31 includes a communication circuit for information communication via the telecommunication line 5, and controls information communication with the mobile terminal device 2 and the server device 4 via the telecommunication line 5. Specifically, the mobile communication controller 31 modulates a transmission target signal into the frequency band of the telecommunication line 5 and transmits the modulated signal, while demodulating the received signal in the frequency band of the telecommunication line 5.

The short-range communication controller 32 includes an electronic circuit having an information communication function compliant with the standards such as NFC, BLE, and IrDA, and controls short-range wireless communication with the mobile terminal device 2. Specifically, the short-range communication controller 32 modulates the transmission target signal and transmits the modulated signal to the mobile terminal device 2, while demodulating the signal received from the mobile terminal device 2.

The position information detector 33 includes a device that receives a radio wave from a GPS satellite to detect position information of the vehicle 3, and outputs an electric signal indicating the detected position information of the vehicle 3 to the ECU 34. As a method for detecting the position information of the vehicle 3, it is also possible to adopt a method combining Light Detection and Ranging, Laser Imaging Detection and Ranging (LiDAR) with a three-dimensional digital map.

The ECU 34 includes: a processor including a CPU, DSP, FPGA, or the like; and a storage unit 34a including RAM, ROM, or the like. The ECU 34 executes a computer program stored in the storage unit 34a to integrally control the operation of various components mounted on the vehicle 3. In the present embodiment, the ECU 34 authenticates the mobile terminal device 2 by collating the key information 27c transmitted from the mobile terminal device 2 with the key information 27c stored in the storage unit 34a. When the mobile terminal device 2 is authenticated, the ECU 34 controls the vehicle controller 35 to unlock or lock the door of the vehicle 3. In addition, in response to the reception of the setting signal or the stopping signal of the remote immobilizer function from the server device 4, the ECU 34 controls the vehicle controller 35 to prohibit or permit startup of the engine of the vehicle 3.

The vehicle controller 35 controls operations of various components mounted on the vehicle 3 in accordance with a control signal from the ECU 34. In the present embodiment, the vehicle controller 35 controls the locking/unlocking of the door of the vehicle 3 in accordance with a control signal from the ECU 34. In addition, the vehicle controller 35 prohibits or permits startup of the engine of the vehicle 3 in accordance with a control signal from the ECU 34.

An example of the server device 4 is an information processing device such as a workstation. The server device 4 includes a communication controller 41, a storage unit 42, a user information database (user information DB) 43, and a control unit 44.

The communication controller 41 includes a communication circuit for information communication via the telecommunication line 5, and controls information communication with the mobile terminal device 2 and the vehicle 3 via the telecommunication line 5. Specifically, the communication controller 41 modulates a transmission target signal into the frequency band of the telecommunication line 5 and transmits the modulated signal, while demodulating the received signal in the frequency band of the telecommunication line 5.

The storage unit 42 includes a recording medium such as EPROM, an HDD, and a removable medium. The storage unit 42 stores various computer programs and various types of control data necessary for the operation of the server device 4.

The user information DB 43 stores unique identification information assigned to the mobile terminal device 2 carried by the user and unique identification information assigned to the vehicle 3 owned by the user in association with each other.

The control unit 44 includes: a processor including a CPU, DSP, FPGA, or the like; and a main storage unit including RAM, ROM, or the like. The control unit 44 loads the computer program stored in the storage unit 42 into the work area of the main storage unit, and executes the computer program to control individual components of the server device 4.

In the vehicle control system 1 having such a configuration, the mobile terminal device 2 executes the following stop process and setting process to improve the convenience of the smart key function. Hereinafter, operation of the mobile terminal device 2 when executing the stop process and the setting process will be described with reference to FIGS. 2 and 3.

FIG. 2 is a flowchart illustrating a flow of a stop process according to the embodiment. The flowchart illustrated in FIG. 2 starts when the state of the stop flag indicating whether the smart key function is stopped is in an off state which indicates that the smart key function is not stopped, and the stop process proceeds to step S1. The stop process is repeatedly executed each time a predetermined time has elapsed since the end of the previous stop process during the time when the state of the stop flag is the off state.

In the process of step S1, the short-range communication controller 22 receives the radio wave output from the wireless communication device 6. When the radio wave may not be received from the wireless communication device 6, the state determination unit 28a ends the series of stop processes. This completes the process of step S1, and the stop process proceeds to the process of step S2.

In the process of step S2, the state determination unit 28a reads the wireless communication device information 27d from the storage unit 27. Subsequently, the state determination unit 28a compares the identification information of the wireless communication device 6 included in the received radio wave with the wireless communication device information 27d, and thereby determines whether the wireless communication device that has output the radio wave is the wireless communication device 6 registered in the wireless communication device information 27d. When it is determined that the wireless communication device that has output the radio wave is the wireless communication device 6 registered in the wireless communication device information 27d (step S2: Yes), the state determination unit 28a controls the stop process to proceed to the process of step S3. In contrast, when the wireless communication device that has output the radio wave is not the wireless communication device 6 registered in the wireless communication device information 27d (step S2: No), the state determination unit 28a ends the series of stop processes.

In the process of step S3, the state determination unit 28a determines whether a state in which the intensity of the radio wave output from the wireless communication device 6 is a threshold or more has continued for a predetermined time. When it is determined that the state in which the intensity of the radio wave output from the wireless communication device 6 is the threshold or more has continued for the predetermined time (step S3: Yes), the state determination unit 28a controls the stop process to proceed to the process of step S4. In contrast, when the state in which the intensity of the radio wave output from the wireless communication device 6 is the threshold or more has not continued for the predetermined time (step S3: No), the state determination unit 28a ends the series of stop processes.

In the process of step S4, the vehicle operation controller 28b stops the smart key function so as to invalidate execution of the smart key function. At this time, the vehicle operation controller 28b may transmit a remote immobilizer function setting request signal to the server device 4 via the telecommunication line 5. In this case, in response to the reception of the remote immobilizer function setting request signal from the mobile terminal device 2, the server device 4 reads, from the user information DB 43, identification information of the vehicle 3 that has been associated with the identification information of the mobile terminal device 2 included in the setting request signal. Subsequently, the server device 4 communicates with the vehicle 3 corresponding to the identification information read via the telecommunication line 5, thereby setting the remote immobilizer function. This completes the process of step S4, and the stop process proceeds to the process of step S5.

In the process of step S5, the vehicle operation controller 28b sets the state of the stop flag to an on state which indicates that the smart key function is stopped. Subsequently, the vehicle operation controller 28b sets the state of the indicator 26 to a state indicating that the smart key function is stopped. When the remote immobilizer function is set in the process of step S4, the vehicle operation controller 28b sets the state of the indicator 26 to a state indicating that the remote immobilizer function is set. This completes the process of step S5, ending the series of stop process.

FIG. 3 is a flowchart illustrating a flow of a setting process according to the embodiment. The flowchart illustrated in FIG. 3 starts when the state of the stop flag is in the on state, and the setting process proceeds to step S11. The setting process is repeatedly executed each time a predetermined time has elapsed since the end of the previous setting process during the time when the state of the stop flag is the on state.

In the process of step S11, the short-range communication controller 22 receives the radio wave output from the wireless communication device 6. When the radio wave may not be received from the wireless communication device 6 for a predetermined time, the state determination unit 28a controls the setting process to proceed to the process of step S14. This completes the process of step S11, and the setting process proceeds to the process of step S12.

In the process of step S12, the state determination unit 28a reads the wireless communication device information 27d from the storage unit 27. Subsequently, the state determination unit 28a compares the identification information of the wireless communication device 6 included in the received radio wave with the wireless communication device information 27d, and thereby determines whether the wireless communication device that has output the radio wave is the wireless communication device 6 registered in the wireless communication device information 27d. When it is determined that the wireless communication device that has output the radio wave is the wireless communication device 6 registered in the wireless communication device information 27d (step S12: Yes), the state determination unit 28a controls the setting process to proceed to the process of step S13. In contrast, when the wireless communication device that has output the radio wave is not the wireless communication device 6 registered in the wireless communication device information 27d (step S12: No), the state determination unit 28a controls the setting process to proceed to the process of step S14.

In the process of step S13, the state determination unit 28a determines whether the state in which the intensity of the radio wave output from the wireless communication device 6 is below a threshold has continued for a predetermined time. When it is determined that the state in which the intensity of the radio wave output from the wireless communication device 6 is below the threshold has continued for the predetermined time (step S13: Yes), the state determination unit 28a controls the setting process to proceed to the process of step S14. In contrast, when the state in which the intensity of the radio wave output from the wireless communication device 6 is below the threshold has not continued for the predetermined time (step S13: No), the state determination unit 28a ends the series of setting processes.

In the process of step S14, the vehicle operation controller 28b restores the smart key function so as to validate the execution of the smart key function. When the remote immobilizer function is set during the stop process, the vehicle operation controller 28b transmits, in this process, a remote immobilizer function cancellation request signal to the server device 4 via the telecommunication line 5. In response to the reception of the remote immobilizer function cancellation request signal from the mobile terminal device 2, the server device 4 reads, from the user information DB 43, identification information of the vehicle 3 stored in association with the identification information of the mobile terminal device 2 included in the cancellation request signal. Subsequently, the server device 4 communicates with the vehicle 3 corresponding to the identification information read via the telecommunication line 5, thereby cancelling the remote immobilizer function. This completes the process of step S14, and the setting process proceeds to the process of step S15.

In the process of step S15, the vehicle operation controller 28b sets the state of the stop flag to the off state. Furthermore, the vehicle operation controller 28b sets the state of the indicator 26 to a state indicating that the smart key function is set. When the remote immobilizer function has been cancelled in the process of step S14, the vehicle operation controller 28b sets the state of the indicator 26 to a state indicating that the remote immobilizer function is not set. This completes the process of step S15, ending the series of cancellation process.

As clearly illustrated above, in the vehicle control system 1, the control unit 28 stops the smart key function when a state where the intensity of the radio wave received from the pre-registered wireless communication device 6 is a threshold or more has continued for a predetermined time. With this configuration, the smart key function is automatically stopped when the user is at a place where there is no need to use the smart key function, such as at home or in a company, leading to improvement of the convenience of the smart key function.

According to the present disclosure, it is possible to improve the convenience of the smart key function.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control device comprising
a processor comprising hardware, the processor being configured to:
stop a smart key function of a vehicle when a first state in which an intensity of a radio wave received from a predetermined wireless communication device is a threshold or more has continued for a predetermined time; and
restore the smart key function when a second state in which the intensity of the radio wave received from the wireless communication device is below a threshold has continued for a predetermined time in a state where the smart key function is stopped.

2. The vehicle control device according to claim 1, wherein the processor is configured to transmit a first signal requesting setting of a remote immobilizer function of a vehicle when the first state has continued for the predetermined time.

3. The vehicle control device according to claim 2, wherein the processor is configured to transmit a second signal requesting cancellation of the remote immobilizer function when the second state has continued for the predetermined time in a state where the remote immobilizer function is stopped.

4. The vehicle control device according to claim 1, wherein the predetermined wireless communication device is a wireless communication device registered in advance by a user.

5. The vehicle control device according to claim 4, wherein the predetermined wireless communication device is a wireless communication device installed in a home of the user and/or a company with which the user works.

6. The vehicle control device according to claim 1, wherein the processor is configured to output information indicating an operation state of the smart key function.

7. A vehicle control system comprising:
a vehicle;
a key comprising a first processor comprising hardware; and
a server comprising a second processor comprising hardware;
wherein the first processor is configured to:
stop a smart key function of the vehicle when a first state in which an intensity of a radio wave received from a predetermined wireless communication device is a threshold or more has continued for a predetermined time; and
restore the smart key function when a second state in which the intensity of the radio wave received from the wireless communication device is below a threshold has continued for a predetermined time in a state where the smart key function is stopped.

8. The vehicle control system according to claim 7, wherein
the first processor is configured to transmit a first signal requesting the setting of the remote immobilizer function of the vehicle when the first state has continued for the predetermined time, and
the second processor is configured to set the remote immobilizer function by communicating with the vehicle in response to the reception of the first signal.

9. The vehicle control system according to claim 8, wherein
the first processor is configured to transmit a second signal requesting cancellation of the remote immobilizer function when the second state has continued for the predetermined time in a state where the remote immobilizer function is stopped, and
the second processor is configured to stop the remote immobilizer function by communicating with the vehicle in response to the reception of the second signal.

10. The vehicle control system according to claim 7, wherein the predetermined wireless communication device is a wireless communication device registered in advance by a user.

11. The vehicle control system according to claim 10, wherein the predetermined wireless communication device is a wireless communication device installed in a home of the user and/or a company with which the user works.

12. The vehicle control system according to claim 7, wherein the first processor is configured to output information indicating an operation state of the smart key function.

13. A non-transitory computer-readable recording medium on which an executable program is recorded, the program causing a processor of a computer to execute:
stopping a smart key function of a vehicle when a first state in which an intensity of a radio wave received from a predetermined wireless communication device is a threshold or more has continued for a predetermined time; and
restoring the smart key function when a second state in which the intensity of the radio wave received from the wireless communication device is below a threshold has continued for a predetermined time in a state where the smart key function is stopped.

14. The non-transitory computer-readable recording medium according to claim 13, causing the processor to execute transmitting a first signal requesting setting of a remote immobilizer function of a vehicle when the first state has continued for the predetermined time.

15. The non-transitory computer-readable recording medium according to claim 14, causing the processor to execute transmitting a second signal requesting cancellation of the remote immobilizer function when the second state has continued for the predetermined time in a state where the remote immobilizer function is stopped.

16. The non-transitory computer-readable recording medium according to claim 13, wherein the predetermined wireless communication device is a wireless communication device registered in advance by a user.

17. The non-transitory computer-readable recording medium according to claim 16, wherein the predetermined wireless communication device is a wireless communication device installed in a home of the user and/or a company with which the user works.

* * * * *